(12) United States Patent
TerHaar et al.

(10) Patent No.: US 12,725,221 B2
(45) Date of Patent: Sep. 1, 2026

(54) SYSTEM AND METHOD FOR ROTATING, SCALING, CROPPING, AND DE-WARPING STREAMED VIDEO

(71) Applicant: Gentex Corporation, Zeeland, MI (US)

(72) Inventors: Micah W. TerHaar, Byron Center, MI (US); Dale M. Radcliff, Hudsonville, MI (US); Thomas A. Case, IV, Cedar Springs, MI (US); Andrew J. Oosterhouse, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 269 days.

(21) Appl. No.: 18/760,316

(22) Filed: Jul. 1, 2024

(65) Prior Publication Data

US 2025/0005706 A1 Jan. 2, 2025

Related U.S. Application Data

(60) Provisional application No. 63/511,383, filed on Jun. 30, 2023.

(51) Int. Cl.
*G06T 3/4007* (2024.01)
*G06T 3/60* (2024.01)

(52) U.S. Cl.
CPC .............. *G06T 3/4007* (2013.01); *G06T 3/60* (2013.01)

(58) Field of Classification Search
CPC ................................ G06T 3/4007; G06T 3/60
See application file for complete search history.

(56) References Cited

U.S. PATENT DOCUMENTS

| | | | | |
|---|---|---|---|---|
| 8,265,422 | B1 * | 9/2012 | Jin | H04N 25/61 348/580 |
| 10,110,814 | B1 | 10/2018 | Day | |
| 2018/0108113 | A1 * | 4/2018 | Guo | G06T 3/4053 |
| 2018/0315170 | A1 | 11/2018 | Mills | |
| 2019/0281319 | A1 | 9/2019 | Galpin et al. | |
| 2019/0370930 | A1 | 12/2019 | Dahlberg et al. | |
| 2021/0209725 | A1 | 7/2021 | Humbert et al. | |

* cited by examiner

*Primary Examiner* — David F Dunphy
(74) *Attorney, Agent, or Firm* — Price Heneveld LLP; Brian James Brewer

(57) ABSTRACT

A method for processing streamed video from an imager that provides raw image data including input image frames. The method including: a) selecting segment data for two segments for each row of the input image frames using parameters for a desired image transformation; b) selecting step data containing information on how far to move in an input image frame before generating an output pixel and the location for the output pixel; c) receiving the input image frames from the imager in a streaming fashion, the image processor buffering rows of one of the input image frames; d) processing each of the buffered rows of one of the input image frames using the segment data and step data to map and modify the input pixels, interpolating to create one of the output image frames having output pixels; and e) repeating steps a)-d) for each row of each input image frame.

20 Claims, 4 Drawing Sheets

SYSTEM AND METHOD FOR ROTATING, SCALING, CROPPING, AND DE-WARPING STREAMED VIDEO

CROSS-REFERENCE TO RELATED APPLICATION

This application claims priority to and the benefit under 35 U.S.C. § 119(e) of U.S. Provisional Patent Application No. 63/511,383, filed on Jun. 30, 2023, entitled "STREAMING METHOD FOR ROTATING, SCALING, CROPPING, AND DE-WARPING AN IMAGE," by Micah W. TerHaar et al., the entire disclosure of which is incorporated herein by reference.

TECHNOLOGICAL FIELD

The present embodiments generally relate to a system and method of processing streamed video images, and more particularly, to a system and method of processing streamed video images for use in a vehicle.

SUMMARY OF THE INVENTION

In one aspect of the invention, an imaging system is provided for processing streamed video images. The imaging system including: an imager providing raw image data including a plurality of input image frames each having a plurality of input pixels arranged in a number M of rows and a number N of columns; a controller for selecting segment data for two segments for each row of the input image frames using parameters for a desired image transformation, wherein each of the two segments controls high-level details for each row, the controller also selecting step data containing information on how far to move in an input image frame before generating an output pixel and the location for the output pixel; an image processor coupled to the imager and the controller, the image processor configured to: a) receive the segment data and step data with which to process the input image frames to affect the desired image transformation, b) receive the input image frames from the imager in a streaming fashion, the image processor buffering rows of one of the input image frames, c) process each of the buffered rows of one of the input image frames using the segment data and step data to map and modify the input pixels, interpolating to create one of the output image frames having a plurality of output pixels arranged in a number P of rows and a number Q of columns, wherein the number of rows buffered in step b) is sufficient to perform interpolation, and d) repeat steps a)-c) for each row of each input image frame and for each input image frame; and a display for displaying a streamed video including at least the output image frames.

In another aspect of the invention, a display system is provided for processing streamed video images received from an imager, the imager providing raw image data including a plurality of input image frames each having a plurality of input pixels arranged in a number M of rows and a number N of columns. The display system including: a controller for selecting segment data for two segments for each row of the input image frames using parameters for a desired image transformation, wherein each of the two segments controls high-level details for each row, the controller also selecting step data containing information on how far to move in an input image frame before generating an output pixel and the location for the output pixel, wherein the segment and step data are updated on a frame-by-frame basis; an image processor coupled to the imager and the controller, the image processor configured to: a) receive the segment data and step data with which to process the input image frames to affect the desired image transformation, b) receive the input image frames from the imager in a streaming fashion, the image processor buffering rows of one of the input image frames, c) process each of the buffered rows of one of the input image frames using the segment data and step data to map and modify the input pixels, interpolating to create one of the output image frames having a plurality of output pixels arranged in a number P of rows and a number Q of columns, wherein the number of rows buffered in step b) is sufficient to perform interpolation, and d) repeat steps a)-c) for each row of each input image frame and for each input image frame; and a display for displaying a streamed video including at least the output image frames.

In another aspect of the invention, a method is provided for processing streamed video images received from an imager, the imager providing raw image data including a plurality of input image frames each having a plurality of input pixels arranged in a number M of rows and a number N of columns. The method including: a) selecting segment data for two segments for each row of the input image frames using parameters for a desired image transformation, wherein each of the two segments controls high-level details for each row; b) selecting step data containing information on how far to move in an input image frame before generating an output pixel and the location for the output pixel; c) receiving the input image frames from the imager in a streaming fashion, the image processor buffering rows of one of the input image frames; d) processing each of the buffered rows of one of the input image frames using the segment data and step data to map and modify the input pixels, interpolating to create one of the output image frames having a plurality of output pixels arranged in a number P of rows and a number Q of columns, wherein the number of rows buffered in step b) is sufficient to perform interpolation; e) repeating steps a)-d) for each row of each input image frame and for each input image frame; and f) displaying a streamed video including at least the output image frames.

These and other features, advantages, and objects of the present device will be further understood and appreciated by those skilled in the art upon studying the following specification, claims, and appended drawings.

BRIEF DESCRIPTION OF THE DRAWINGS

The embodiments will now be described with reference to the following drawings, in which.

DETAILED DESCRIPTION OF EMBODIMENTS

It is also to be understood that the specific devices and processes illustrated in the attached drawings and described in the following specification are simply exemplary embodiments of the inventive concepts defined in the appended claims. Hence, specific characteristics relating to the embodiments disclosed herein are not to be considered as limiting, unless the claims expressly state otherwise.

The terms "including," "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The embodiments described herein relate to an image processing system and a method for image processing, which are particularly suitable for use in a vehicle. Specifically, vehicles now frequently use one or more imagers (or cameras) that capture video images and stream the video images to a display after image processing is performed. Conventionally, the image processing involves a series of steps to transform a raw image from an imager to what the user is accustomed to seeing in the form of video. Some of those steps involve scaling, cropping, rotating, and compensating for geometric distortions produced by the lens through de-warping. Currently, each of these steps is performed discretely with different algorithms on an entire image frame. However, storing an entire image frame during each step is memory-intensive and time-intensive.

Prior to describing the novel image processing method, some of the hardware will first be described with reference to FIGS. 1 and 2.

Figure 1:
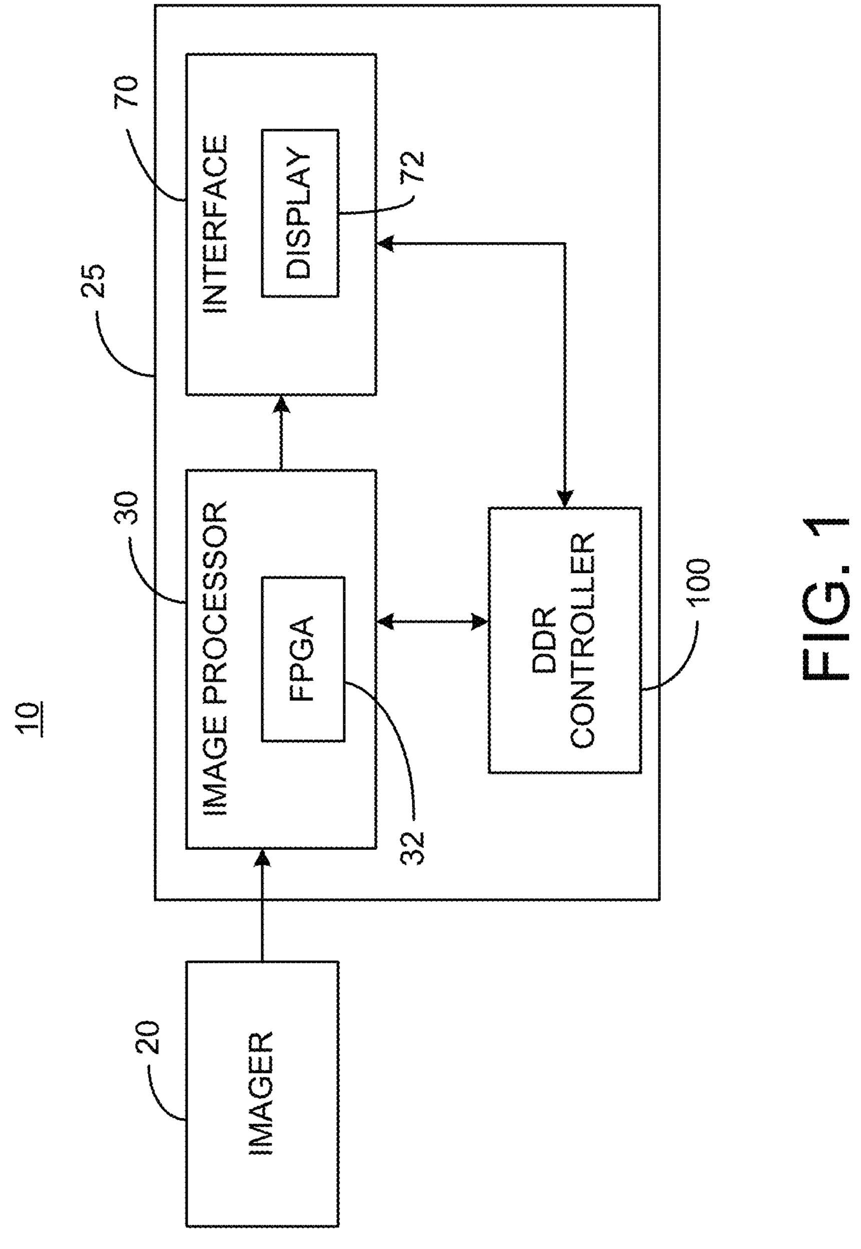
FIG. 1 is an electrical diagram in block form of an imaging system according to an embodiment described herein.

FIG. 1 shows an imaging system 10 having an imager 20, an image processor 30 including a field-programmable gate array (FPGA) 32, an interface 70 including a display 72, and a DDR controller 100. The image processor 30, DDR controller 100, and interface 70 form a display system 25. The imager 20 provides raw image data including a plurality of input image frames each having a plurality of input pixels arranged in a number M of rows and a number N of columns. The raw image data may be 12-bit RGB data, for example, that is subject to streaming back-end processing 22 (FIG. 2).

The DDR controller 100 selects segment data 24 for the image processor 30 to use to process the raw image data. The segment data 24 includes a plurality of parameters with which to process the input image frames to affect the desired image transformation. The segment data may, for example, be 80-bit data. The DDR controller 100 also selects 16-bit step data 26 associated with the segment data 24. The segment and step data may be fixed or may vary based on input from a user or may vary dynamically. For example, if an auto-aim feature is used whereby the vanishing point on the horizon of an imaged scene is located and centered in the image, the DDR controller 100 may change the segment data 24 and/or step data 26 so that the output images will have the desired centering.

Figure 2:
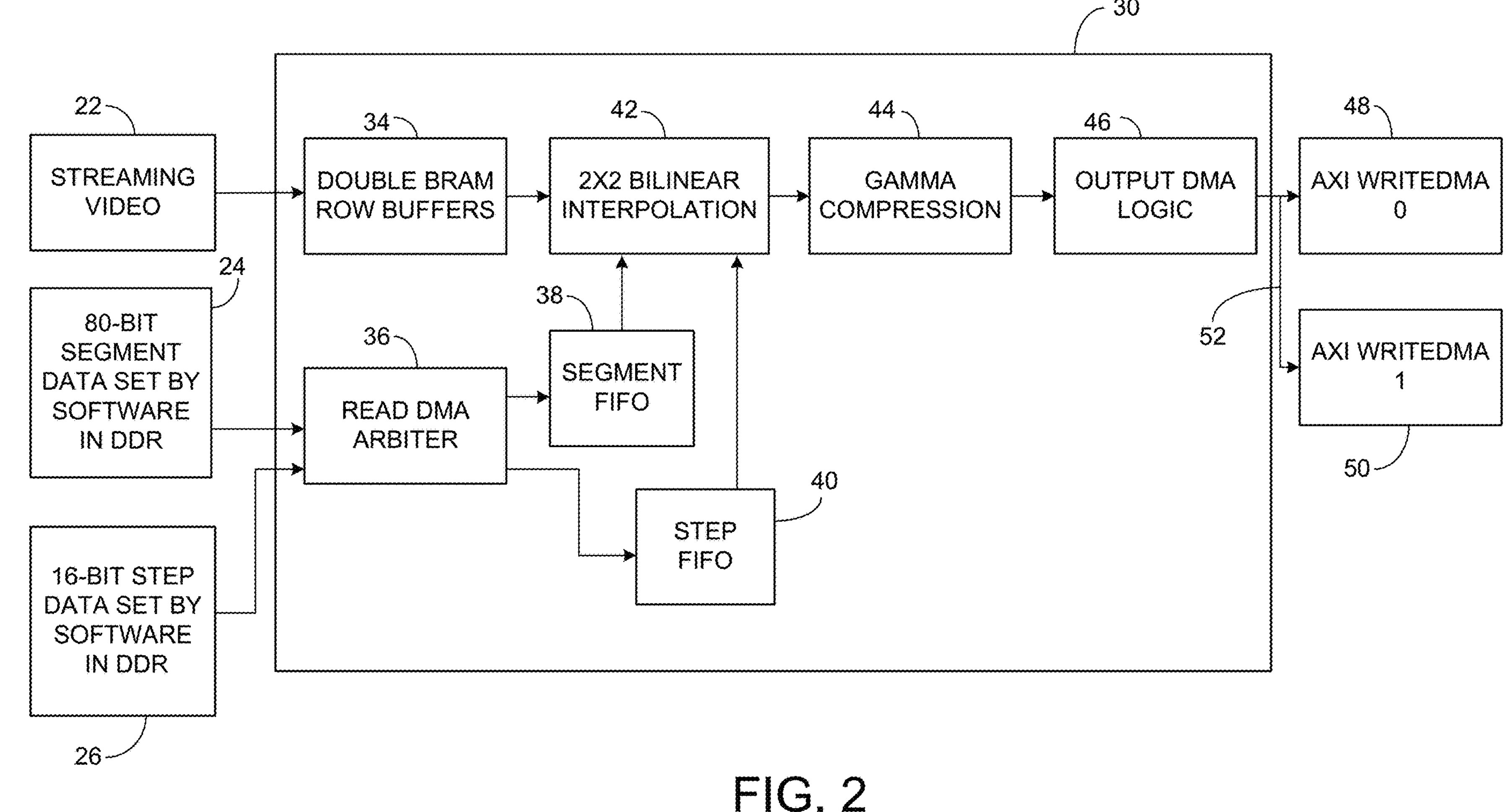
FIG. 2 is an electrical diagram in block form of an image processor used in the image system shown in FIG. 1.

Referring to FIG. 2, the image processor 30 may include double BRAM row buffers 34 that store two rows of an input image frame at a time. Note that the number of rows to be buffered should be sufficient to implement any interpolation as described below. The image processor 30 may also include a read DMA arbiter 36 that receives both the segment data 24 and the step data 26 and provides the segment data to a segment FIFO buffer 38 and provides the step data to a step FIFO buffer 40. As explained in more detail below, a 2×2 bilinear interpolation 42 is performed on the two rows of raw image data supplied by the double BRAM row buffers 34 based on segment data and step data supplied by the segment FIFO buffer 38 and the step FIFO buffer 40, respectively. The interpolation 42 may receive 12-bit RGB data and output 12-bit RGB data to an optional gamma compression functional block 44. The gamma compression functional block 44 may output 8-bit sRGB data to an output DMA logic block 46, which outputs to AXI Write DMA 0 48 and AXI Write DMA 1 50 via an AXI interface bus 52. The AXI Write DMA 0 48 and AXI Write DMA 1 50 are used to write to rows of output image data to form an output image frame. The output image frames have a plurality of output pixels arranged in a number P of rows and a number Q of columns, where P and Q may be different from M and N of the input image frame. Thus, the output image frame may have a different resolution than the input image frame. The output image frame may then be supplied to the display 72. Optionally, information may be overlayed onto the output image frame.

Having described the hardware, the method of image processing will now be described below along with an example.

The method for transforming a raw image into what the user is accustomed to seeing may involve two distinct steps. The first step takes the desired rotation angle, scaling factor, crop region, and de-warp parameters to produce two segments per row of the input video image frame and a series of steps describing each output pixel in that row. The segments (segment data) control the high-level details for each row such as the starting (inX, inY) location in the streaming input image frame and the starting (outX, outY) location in the output image frame as well as a step count (i.e., how many pixels are defined by this segment). There may be two segments created per row and a count of 0 indicates that a segment is unused. Generally, the second segment will be used when applying a de-warp function.

Then, the steps are generated. The segment count indicates how many steps must be generated for that segment. The steps contain information on how far to move in the input image before generating the next output pixel and the location relative to the last location (X',Y') for this pixel in the output image frame. All streaming input pixel (X,Y) locations may be in 1/16 pixel resolution allowing for fractional pixel locations and step sizes. The output pixel (X',Y') locations and steps are in whole pixel increments.

Once these tables are generated, that information is used to process the streaming image. The segments and steps are loaded, and each output pixel generated goes through a multistep process. The first is a 2×2 bilinear interpolation. Since the input pixel (X,Y) locations are in 1/16 of a pixel resolution, the interpolation process 42 incorporates this fractional resolution when determining weighting for each pixel in the 2×2 to produce the output of this step. In the event of a de-warp, it is possible to have two segments where only part of an incoming row is used before skipping a section only to resume later in the line.

On a frame-by-frame basis, software executed by the DDR controller 100 may update the segment and step data. These two pieces of data are calculated in software to control the rotation, zoom, crop, and de-warp features of this module. The data follows a specific format as outlined below.

The segment data 24 may be an 80-bit field with two segments per row. The segment(s) may be "NULL" which indicates no modification to the incoming data. Each segment specifies a starting point for both the input and output and a count indicating how many pieces of step data 26 are described by this segment. An example of this 80-bit field is shown in the table below.

| Parameter | Size | Description |
|---|---|---|
| inX | 16-bits | U16Q4 The first X location in this section from the incoming data that is mapped to the output. |
| inY | 16-bits | U16Q4 The first Y location in this section from the incoming data that is mapped to the output. |
| outX | 16-bits | The X location that the first pixel in this segment will be mapped to. |
| outY | 16-bits | The Y location that the first pixel in this segment will be mapped to. |
| count | 16-bits | The number of points in this segment that will be mapped to the output. This is an indication of how many steps are in this segment. |

The step data 26 may be a 16-bit field as shown in the table below.

| Parameter | Size | Description |
|---|---|---|
| inX | 6-bits | U6Q4 Offset from the segment inX indicating where this pixel is coming from in the incoming image. |
| inY | 4-bits | U4Q4 Offset from the segment inY indicating where this pixel is coming from in the incoming image. |
| outX | 1-bit | ΔX from the previous output pixel Range: 0, 1 |
| outY | 3-bits | Signed ΔY from the previous pixel Range: −4 to +3 |
| endRow | 1-bit | Is used to indicate when to end an active DMA. |
| unused | 1-bit | Padding to make this 16-bits long for ease of software and hardware read/write. |

In general, the segments tell where to start in an input image and where the output pixel goes. The steps describe how to iterate across the incoming lines and map that to the output. All pixels in the output image frame will be mapped to a segment. There can be <n> steps per row but only two segments per input row. Each step can map into a different output row so the actual number of transitions per streaming input row may be managed in software to prevent excessive DDR DMA writes.

At the start of each row the first segment is read. Starting with (inX, inY), a pixel will be processed using a simple 2×2 bilinear interpolation and then mapped to (outX, outY). After this first pixel, the first step will apply and use the inX and inY delta advance to the next input pixel. This pixel will then be mapped to the next pixel location determined by the outX and outY delta from the previous pixel. Assuming this pixel maps to the same output row as the previous pixel, it will be buffered up for a DMA write. The design implements the two full AXI write DMAs 48 and 50 and alternates between them to push pixel data into DRAM. The endRow bit is included with the pixel data to indicate that this is the last sequential pixel and to terminate the current DMA, as the next access to this DMA will require a new starting address. If it is a new row, then the old data will be passed to the DMA engine and a new buffer will be started. This process of steps repeats until the count number of steps have been taken. At this point a new segment will be read in. If the count is 0 then this input row is complete, and no more data appears in the output based on this row. The next segment will be read in, and a new line will be processed. If this segment has a non-zero value, then the process outlined above will be followed for the next segment. Regardless of the content of the second segment, it may be preferred that there can be no more than two segments per row. After the second segment is processed there will always be an advance to the next input row.

Due to the fact that a zoom feature can be implemented results in 1:N pixels on the output it is possible to generate more pixels than are available in a given row's active time. The limitation is defined based on the number of output pixels. The maximum limit is to not exceed the row active time plus horizontal blanking time. Anything above this and overruns will occur, and data will be lost. If there is any cropping occurring during this operation, then the maximum number of pixels will be reduced by the number of pixels skipped during the crop operation. This may be illustrated with the following equation:

$$\text{MaxOutputPixelsPerRow} = \text{ActivePixels} \times \text{ClocksPerPixel} + \text{HorizontalBlankingClocks}$$

Figure 3:
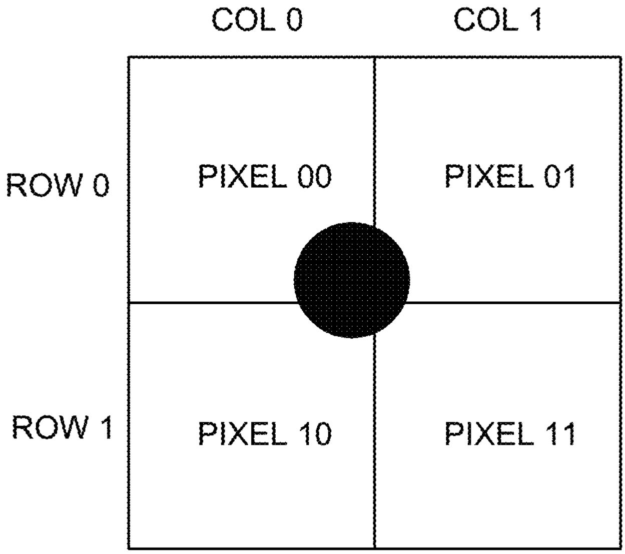
FIG. 3 is a pictorial representation of the interpolation performed by the image processor shown in FIG. 2.

The bilinear interpolation may use a 2×2 kernel. Fractional pixels are assigned to the input X and Y pixel locations and then the kernel interpolates using the appropriate weights of each of the 4 pixels in the kernel. The weighting is based on 1/16 of a pixel increments. Each pixel contribution is based on this 1/16 pixel offset. Every pixel location is multiplied by the row and column weight. An example pixel is shown in FIG. 3. The pixel is skewed to the top left of the 2×2 kernel, but it has a little bit from each of the four pixels. Each pixel location consists of an RGB trio so this calculation is performed three times for every pixel location. By definition, the pixel location will always be in the top left corner (pixel 00) of the 2×2 kernel.

The formula for weighting each pixel and determining the final pixel values is:

$$\text{row}_0 = \frac{srcY}{\text{pixelScale}}$$

$$\text{row}_1 = \text{row}_0 + 1$$

$$\text{row}_1\text{Weight} = srcY \bmod \text{pixelScale}$$

$$\text{row}_0\text{Weight} = \text{pixelScale} - \text{row}_1\text{Weight}$$

$$col_0 = \frac{srcX}{\text{pixelScale}}$$

$$col_1 = col_0 + 1$$

$$col_1\text{Weight} = srcX \bmod \text{pixelScale}$$

$$col_0\text{Weight} = \text{pixelScale} - col_1\text{Weight}$$

$$\text{interpolatePixel} = \frac{\begin{matrix}\text{pixel}_{00} \times \text{row}_0\text{Weight} \times col_0\text{Weight} + \\ \text{pixel}_{01} \times \text{row}_0\text{Weight} \times col_1\text{Weight} + \\ \text{pixel}_{10} \times \text{row}_1\text{Weight} \times col_0\text{Weight} + \\ \text{pixel}_{11} \times \text{row}_1\text{Weight} \times col_1\text{Weight}\end{matrix}}{\text{pixelScale}^2}$$

where srcY is a source Y of a fixed-point fractional pixel.

The output of the interpolation section 42 may still be in 12-bit RGB format, and some compression may be desired for the output to go directly into memory. The gamma compression block 44 can be used to take the 12-bit RGB output and convert it to 8-bit RGB so that it will fit into a single 32-bit word in DDR. After compression, DMA buffering 46 may take place to form packets that will be sent via the AXI interface 52 to a preexisting write DMA module (48,50). Given the possibility (although highly improbable)

of having every step bounce around such that no two consecutive pixels are written to the same output line, the software that generates the segment and step data may have to have some limitation on how it forms this data. The alternating data scenario would create a very large number of discrete DMA writes causing a bandwidth problem and resulting in artifacts on the display 72. To help mitigate this type of situation, an AXI gather module may be placed between this module and the write DMA. This module looks at the incoming AXI writes to determine if the new AXI write packet on a given DMA channel is beginning where the previous segment ended. If this is the case, the end of frame signal will not be sent for the previous packet and the start of frame will be dropped for the new incoming packet. This will result in fewer AXI transactions and help reduce the total number of AXI requests to the DDR controller 100.

Example

Figure 4:
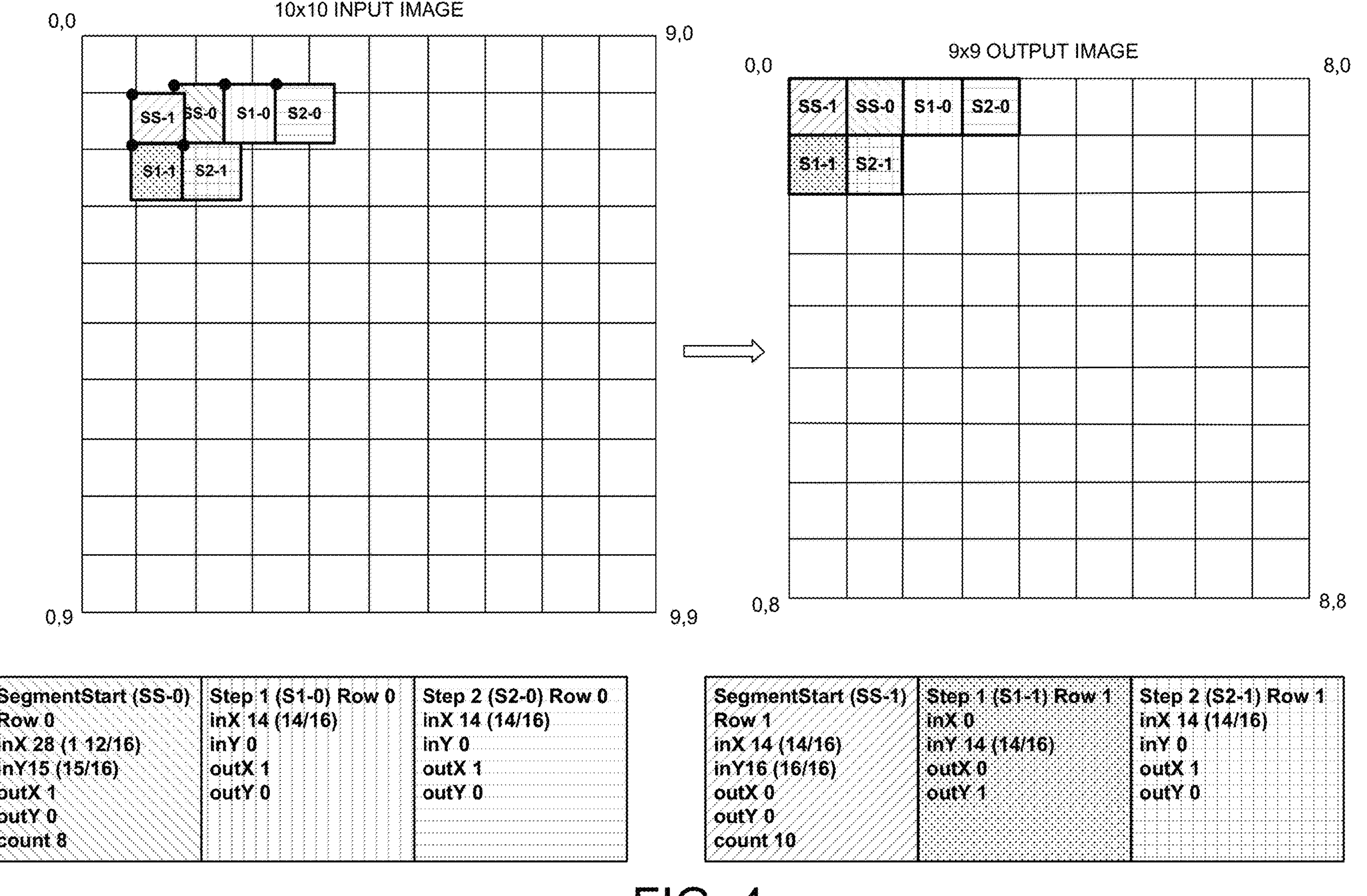
FIG. 4 is a pictorial representation of the image processing performed by the image processor shown in FIG. 2.

The following example was created to demonstrate how the image processor hardware 30 (FPGA 32 design) utilizes the steps and segments produced by the isp-dewarp-lut-generator (software of the DDR controller 100). The example, which is illustrated in FIG. 4, shows a starting image size of 10×10 (M×N) cropped down to 9×9 (P×Q) and rotated 1.00 degrees (clockwise). The segments and steps are consumed in the following manor.

First, start with the segment data 24. In the example below, start with the input image offset values (inX, inY). The inX value will be offset 1.75 pixels from the left side of the image, and the inY will be offset 0.9375 pixels from the top of the image. This creates the starting point. From this offset we can see that our final pixel value in SS is an average of the fractional pieces of the 2×2 kernel that is calculated in the 2×2 bilinear interpolation block 42. Once the final pixel value has been calculated, the outX and outY will dictate the location step in the output image frame to take. In this example, there is no move at all on the outY and a step of 1 is taken on the outX.

The first step occurs in the segment data 24. Once the first step in the segment data 24 is consumed, the design utilizes step data for each pixel in the row until the total step counts are reached as defined in the segment data (count 8 in the example). Each inX and inY just like in the segment data are fractional offsets from the previous inX and inY offsets and each outX and outY is a whole pixel step increment to the next pixel output location.

The diagram of FIG. 4 does not show the output pixels 2×2 interpolation. For simplicity it only captures the remapping of the input image pixel to the output image pixel to show how steps and segments are consumed. As noted, the method starts with the first and second rows of the input image frame, then processes the second and third rows, then the third and fourth rows, etc. In the example provided, there are only 8 steps in the first segment and the first output pixel starts with 1,0 and fills out the rest of the row, and then there are 10 steps in the second segment as it fills output pixel location 0,0 and then the rest of the second row. This is due to the desired rotation angle.

The software executed by the DDR controller 100 may employ the following parameters to generate the segment data 24 and the step data 26:

"width": number of columns in the input image
"height": number of rows in the input image
"angle": "amount to rotate, in degrees"
"fx": "fx coefficient of lens distortion"
"fy": "fy coefficient of lens distortion"
"k1": "k1 coefficient of lens distortion"
"k2": "k2 coefficient of lens distortion"
"outputHeight": "Number of rows in the output image"
"outputWidth": "Number of columns in the output image"
"ox": "ox coefficient of lens distortion"
"oy": "oy coefficient of lens distortion"
"p1": "p1 coefficient of lens distortion"
"p2": "p2 coefficient of lens distortion"
"rotateOx": "x value of the rotation origin"
"rotateOy": "y value of the rotation origin"
"startX": "x value in the input image mapped to the leftmost edge of the output"
"startY": "y value in the input image mapped to the top edge of the output"
"stopX": "x value in the input image mapped to the rightmost edge of the output"
"stopY": "y value in the input image mapped to the bottom edge of the output"

The fx, fy, p1, p2, k1, and k2 parameters are coefficients of the known Brown's distortion model. The ox and oy parameters are known distortion coefficients. The other parameters are desired rotations, cropping, and scaling parameters.

The imaging system 10 may be used in a vehicle where the imager 20 is used to capture an image forward or rearward of the vehicle. The display may be incorporated in a rearview assembly so as to show rearward scenes captured by the imager 20 or may be located in a console or instrument panel of the vehicle.

Although the parameters for the desired image transformation are described as being at least one of a desired rotation angle, a scaling factor, a crop region, and dewarp, other image transformation effects may be performed using the parameters using the segment data 24 and step data 26.

In one aspect of the invention, an imaging system is provided for processing streamed video images. The imaging system including: an imager providing raw image data including a plurality of input image frames each having a plurality of input pixels arranged in a number M of rows and a number N of columns; a controller for selecting segment data for two segments for each row of the input image frames using parameters for a desired image transformation, wherein each of the two segments controls high-level details for each row, the controller also selecting step data containing information on how far to move in an input image frame before generating an output pixel and the location for the output pixel; an image processor coupled to the imager and the controller, the image processor configured to: a) receive the segment data and step data with which to process the input image frames to affect the desired image transformation, b) receive the input image frames from the imager in a streaming fashion, the image processor buffering rows of one of the input image frames, c) process each of the buffered rows of one of the input image frames using the segment data and step data to map and modify the input pixels, interpolating to create one of the output image frames having a plurality of output pixels arranged in a number P of rows and a number Q of columns, wherein the number of rows buffered in step b) is sufficient to perform interpolation, and d) repeat steps a)-c) for each row of each input image frame and for each input image frame; and a display for displaying a streamed video including at least the output image frames.

In another aspect of the invention, a display system is provided for processing streamed video images received from an imager, the imager providing raw image data including a plurality of input image frames each having a plurality of input pixels arranged in a number M of rows and a number N of columns. The display system including: a controller for selecting segment data for two segments for each row of the input image frames using parameters for a desired image transformation, wherein each of the two segments controls high-level details for each row, the controller also selecting step data containing information on how far to move in an input image frame before generating an output pixel and the location for the output pixel, wherein the segment and step data are updated on a frame-by-frame basis; an image processor coupled to the imager and the controller, the image processor configured to: a) receive the segment data and step data with which to process the input image frames to affect the desired image transformation, b) receive the input image frames from the imager in a streaming fashion, the image processor buffering rows of one of the input image frames, c) process each of the buffered rows of one of the input image frames using the segment data and step data to map and modify the input pixels, interpolating to create one of the output image frames having a plurality of output pixels arranged in a number P of rows and a number Q of columns, wherein the number of rows buffered in step b) is sufficient to perform interpolation, and d) repeat steps a)-c) for each row of each input image frame and for each input image frame; and a display for displaying a streamed video including at least the output image frames.

In another aspect of the invention, a method is provided for processing streamed video images received from an imager, the imager providing raw image data including a plurality of input image frames each having a plurality of input pixels arranged in a number M of rows and a number N of columns. The method including: a) selecting segment data for two segments for each row of the input image frames using parameters for a desired image transformation, wherein each of the two segments controls high-level details for each row, b) selecting step data containing information on how far to move in an input image frame before generating an output pixel and the location for the output pixel, c) receiving the input image frames from the imager in a streaming fashion, the image processor buffering rows of one of the input image frames; d) processing each of the buffered rows of one of the input image frames using the segment data and step data to map and modify the input pixels, interpolating to create one of the output image frames having a plurality of output pixels arranged in a number P of rows and a number Q of columns, wherein the number of rows buffered in step b) is sufficient to perform interpolation, e) repeating steps a)-d) for each row of each input image frame and for each input image frame; and f) displaying a streamed video including at least the output image frames.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. An imaging system for processing streamed video images, the system comprising:

an imager providing raw image data including a plurality of input image frames each having a plurality of input pixels arranged in a number M of rows and a number N of columns;

a controller for selecting segment data for two segments for each row of the input image frames using parameters for a desired image transformation, wherein each of the two segments controls high-level details for each row, the controller also selecting step data containing information on how far to move in an input image frame before generating an output pixel and the location for the output pixel;

an image processor coupled to the imager and the controller, the image processor configured to:

a) receive the segment data and step data with which to process the input image frames to affect the desired image transformation;

b) receive the input image frames from the imager in a streaming fashion, the image processor buffering rows of one of the input image frames;

c) process each of the buffered rows of one of the input image frames using the segment data and step data to map and modify the input pixels, interpolating to create one of the output image frames having a plurality of output pixels arranged in a number P of rows and a number Q of columns, wherein the number of rows buffered in step b) is sufficient to perform interpolation; and d) repeat steps a)-c) for each row of each input image frame and for each input image frame; and a display for displaying a streamed video including at least the output image frames.

2. The imaging system of claim 1, wherein the image processor comprises a field-programmable gate array (FPGA).

3. The imaging system of claim 1, wherein the number of rows buffered in step b) is two rows of each input image frame.

4. The imaging system of claim 1, wherein the interpolation performed is bilinear interpolation.

5. The imaging system of claim 1, wherein the parameters represent at least one of a desired rotation angle, a scaling factor, a crop region, and dewarp of the desired image transformation.

6. The imaging system of claim 1, wherein the segment and step data are updated on a frame-by-frame basis.

7. The imaging system of claim 1, wherein the streamed video displayed by the display has a different resolution than the raw image data received from the imager.

8. The imaging system of claim 1, wherein P and Q have different values from N and M.

9. A display system for processing streamed video images received from an imager, the imager providing raw image data including a plurality of input image frames each having a plurality of input pixels arranged in a number M of rows and a number N of columns, the display system comprising:

a controller for selecting segment data for two segments for each row of the input image frames using parameters for a desired image transformation, wherein each of the two segments controls high-level details for each row, the controller also selecting step data containing information on how far to move in an input image frame before generating an output pixel and the location for the output pixel, wherein the segment and step data are updated on a frame-by-frame basis;

an image processor coupled to the imager and the controller, the image processor configured to:

a) receive the segment data and step data with which to process the input image frames to affect the desired image transformation;

b) receive the input image frames from the imager in a streaming fashion, the image processor buffering rows of one of the input image frames;

c) process each of the buffered rows of one of the input image frames using the segment data and step data to map and modify the input pixels, interpolating to create one of the output image frames having a plurality of output pixels arranged in a number P of rows and a number Q of columns, wherein the number of rows buffered in step b) is sufficient to perform interpolation; and d) repeat steps a)-c) for each row of each input image frame and for each input image frame; and a display for displaying a streamed video including at least the output image frames.

10. The display system of claim 9, wherein the image processor comprises a field-programmable gate array (FPGA).

11. The display system of claim 9, wherein the number of rows buffered in step b) is two rows of each input image frame.

12. The display system of claim 9, wherein the interpolation performed is bilinear interpolation.

13. The display system of claim 9, wherein the parameters represent at least one of a desired rotation angle, a scaling factor, a crop region, and dewarp of the desired image transformation.

14. The display system of claim 9, wherein the streamed video displayed by the display has a different resolution than the raw image data received from the imager.

15. The display system of claim 9, wherein P and Q have different values from N and M.

16. A method for processing streamed video images received from an imager, the imager providing raw image data including a plurality of input image frames each having a plurality of input pixels arranged in a number M of rows and a number N of columns, the method comprising:

a) selecting segment data for two segments for each row of the input image frames using parameters for a desired image transformation, wherein each of the two segments controls high-level details for each row;

b) selecting step data containing information on how far to move in an input image frame before generating an output pixel and the location for the output pixel;

c) receiving the input image frames from the imager in a streaming fashion, the image processor buffering rows of one of the input image frames;

d) processing each of the buffered rows of one of the input image frames using the segment data and step data to map and modify the input pixels, interpolating to create one of the output image frames having a plurality of output pixels arranged in a number P of rows and a number Q of columns, wherein the number of rows buffered in step b) is sufficient to perform interpolation;

e) repeating steps a)-d) for each row of each input image frame and for each input image frame; and f) displaying a streamed video including at least the output image frames.

17. The method of claim 16, wherein the number of rows buffered in step c) is two rows of each input image frame.

18. The method of claim 16, wherein the interpolation performed is bilinear interpolation.

19. The method of claim 16, wherein the parameters represent at least one of a desired rotation angle, a scaling factor, a crop region, and dewarp of the desired image transformation.

20. The method of claim 16, wherein the segment and step data are updated on a frame-by-frame basis.

* * * * *